United States Patent [19]

Knapp

[11] Patent Number: 4,610,268

[45] Date of Patent: Sep. 9, 1986

[54] MIXER VALVE WITH HARD MATERIAL PLAQUES, HAVING A MOVABLE CARTRIDGE LOADED BY THE WATER PRESSURE

[75] Inventor: Alfons Knapp, Biberach an der Riss, Fed. Rep. of Germany

[73] Assignee: Gevipi A.G., Vaduz, Liechtenstein

[21] Appl. No.: 725,133

[22] Filed: Apr. 18, 1985

[30] Foreign Application Priority Data

May 9, 1984 [IT] Italy ............................ 67464 A/84
May 25, 1984 [IT] Italy ............................ 67530 A/84

[51] Int. Cl.$^4$ .................... F16K 11/078; F16K 25/00
[52] U.S. Cl. ............................ 137/454.6; 137/625.17; 137/625.4; 251/172; 251/174
[58] Field of Search ............ 137/454.6, 625.17, 625.4, 137/625.41; 251/172, 175, 176, 174

[56] References Cited

U.S. PATENT DOCUMENTS

| | | | |
|---|---|---|---|
| 3,476,149 | 11/1969 | Dornaus | 251/172 X |
| 3,570,810 | 3/1971 | Kawolics | 251/172 |
| 3,923,284 | 12/1975 | Stickler et al. | 251/172 |
| 4,005,728 | 2/1977 | Thorp | 251/172 X |
| 4,058,289 | 11/1977 | Hicks | 251/172 X |
| 4,250,912 | 2/1981 | Knapp | 137/315 |
| 4,325,403 | 4/1982 | Uhlmann | 137/315 |

Primary Examiner—Alan Cohan
Assistant Examiner—John A. Rivell
Attorney, Agent, or Firm—Young & Thompson

[57] ABSTRACT

A mixer valve comprising a valve body, control means, a changeable cartridge inserted into the body of the valve, a fixed hard material plaque mounted in the cartridge, and a movable plaque housed in the cartridge, connected to the control means and intended to cooperate with the fixed plaque to carry out the regulation of the flow rate and the mixing ratio, and wherein the changeable cartridge is contained in the body of the valve with an axial clearance; the cartridge carries peripherally, near its inner end, a gasket intended to radially seal in a corresponding bore of the valve body; there is provided a sealing union acting between the cartridge and one of the water inlet pipes; the other water inlet pipe communicates with the bottom portion of the valve body; the remaining portion of the body cavity comunicates with a delivery union; and there may be provided a resilient member acting between the valve body and the cartridge to permanently apply a preloading force onto the plaques.

15 Claims, 12 Drawing Figures

MIXER VALVE WITH HARD MATERIAL PLAQUES, HAVING A MOVABLE CARTRIDGE LOADED BY THE WATER PRESSURE

BACKGROUND OF THE INVENTION

This invention relates to a mixer valve comprising a valve body, control means, a changeable cartridge inserted into the valve body, a hard material fixed plaque mounted in said cartridge, and at least one movable plaque housed in said cartridge, connected to the control means and intended to cooperate with said fixed plaque for carrying out the regulation of the flow rate and the mixing ratio.

To be capable of carrying out an effective closure, the fixed and movable plaques of the mixer valves of the type referred to must be pressed one against the other with an adhesion force proportionate to the pressure of the incoming water, because otherwise the pressure of the water would separate the plaques from one another, thus preventing the closure. The force which keeps the plaques pressed one against the other is usually provided by a spring or by the resiliency of one or more sealing gaskets disposed between the fixed plaque and the valve body. This force must be of such a high value as to be able to support the maximum pressures expected, and even, in particular, the high pressures which are applied in certain conditions of testing, in compliance with the provisions of the laws, and which are much higher than the normal operation pressures. The same high adhesion force is then applied onto the plaques also in the normal operation conditions, thus generating frictions which render unnecessarily difficult the operation of the valve and subjecting the parts of the valve to unnecessary stresses.

Since the spring, or the compressed gasket, has to provide a high adhesion force between the plaques, it must be compressed energically when applying the cover to the valve body, and therefore the cover must be connected to the valve body by means of screws or being screwed itself, thus requiring the use of tools for the application and the removal of the cover and consequently, in particular, for changing the cartridge.

Moreover, the sealing gasket disposed between the fixed plaque and the valve body is usually intended to also compensate for the working tolerances, as well as the thermal expansions to which the cartridge is subjected during the operation, and therefore it must have a considerable free thickness. Accordingly, in case of high pressure differences between the water inlet pipes, and even more in case of pressure shocks, said gasket may be deformed or expelled from its seating, thus rendering unusable the valve.

SUMMARY OF THE INVENTION

The object of this invention is to find a remedy for the cited disadvantages of the known mixer valves of the type referred to. More particularly, an object of the invention is to provide arrangements, thanks to which an adhesive force proportionate to the actual conditions of operation of the valve will always be applied between the plaques of the valve, thus avoiding the permanent application of a unnecessarily high force. Another object of the invention is to provide a valve whose cover may be connected to the body without having to exert a high force at the moment of the application, and therefore, eventually, also without making recourse to any tool. A further object of the invention is to release the sealing gasket disposed between the fixed plaque and the bottom of the cartridge from the task of compensating for the working tolerances and the thermal expansions, thus allowing to give the gasket size and arrangement such as to prevent it from being deformed or expelled in case of an overpressure. A further object of the invention is to provide arrangements in order that the pressure of the water tends to keep the plaques in contact with the bottom of the cartridge, and that under no condition it tends to cause these parts to move away from one another.

These objects are attained, according to the invention, by the fact that the changeable cartridge is contained within the valve body with an axial clearance; that the cartridge carries peripherally, near its bottom end, a sealing gasket intended to radially seal in a corresponding bore of the valve body; that between the cartridge and a seating of the valve body there is provided a sealing union communicating with one of the water inlet pipes; that the other water inlet pipe directly communicates with the bottom portion of the valve body bore; and that the remaining portion of the valve body bore communicates with a delivery union.

Moreover, if needed, there may be provided a resilient member which acts between the valve body and the cartridge.

Therefore, said resilient member (when it is present) permanently applies a preloading force onto the plaques, whereas the pressure of the second water inlet pipe, present within the bottom portion of the valve body, acts onto the cartridge as onto a piston, thus applying to the plaques a force which increases with increasing feeding pressure.

Thanks to these arrangements, the preloading force permanently applied onto the plaques of the valve may be adapted to the requirements of the operation at the minimum feeding pressure, and it does not generate any noticeble friction between the plaques, nor any harmful stress of the parts of the cartridge. In some cases this preloading force is not necessary and then the resilient member acting between the valve body and the cartridge may be omitted. Thanks to the presence of the peripheral gasket and to the axial mobility, the cartridge behaves within the body of the valve such as a piston, and the feeding water, by acting onto that cross-section of the cartridge which carries the peripheral gasket, applies onto the same a force proportionate to its own pressure, and this force is added to said preloading force, when this latter exists, and ensures the adhesion between the plaques even in the presence of the higher pressures or of pressure shocks. The whole adhesive force acting between the plaques is thus adapted at any moment to the actual operative requirements, and the friction and the consequent stresses result in being the minimum unavoidable ones under each operative condition. Since, obviously, the application of the cover is always carried out while the feeding of the water is discontinued, it must produce only the slight preloading force between the plaques, when this latter is required, and therefore the cover may be applied onto the valve body without the use of tools, for example by screwing it manually by acting onto a knurled ring nut thereof, or by applying it in a bayonet fashion, by means of fasteners and so on. The axial clearance with which the cartridge is contained within the valve body compensates for any working tolerance and for the thermal expansions of the cartridge, without affecting the sealing gasket of the fixed plaque, which may be disposed between the fixed plaque and the bottom of the cartridge, without any contact with the valve body. Accordingly, this gasket may be suitably seated and protrude only to a minimum extent, thus remaining protected against any possible deformation or expulsion by unbalanced pressures. Since the adhesion forces are applied onto the plaques through the bottom of the cartridge, in no case there will be originated actions tending to move away the plaques from one another and from the bottom of the cartridge. Finally, the sealing union between the cartridge and a seating of the valve body, communicating with one of the water inlet pipes, ensures the separation between the hot and cold water inlet pipes when the valve is closed.

BREIF DESCRIPTION OF THE DRAWINGS

These and other characteristics and advantages of the subject of the invention will be more clearly apparent from the following description of some embodiments, given by way of non limiting examples and diagrammatically shown in the annexed drawings, in which.

DETAILED DESCRIPTION OF THE PREFERRED EMBODIMENTS

Figure 1:
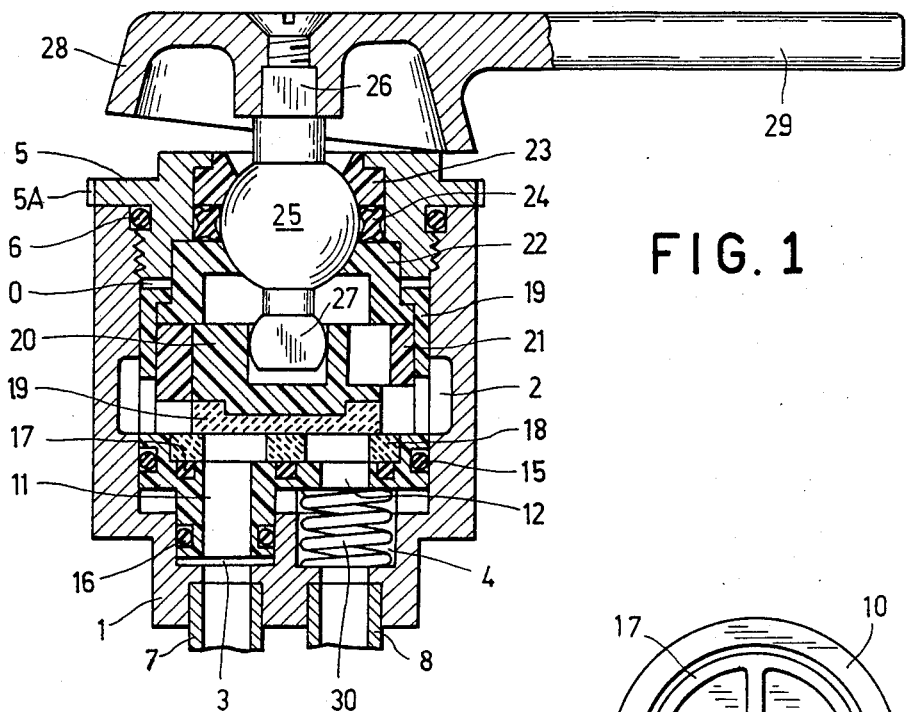
FIG. 1 is a cross-sectional view of a first embodiment of a mixer valve according to the invention.
Figure 2:
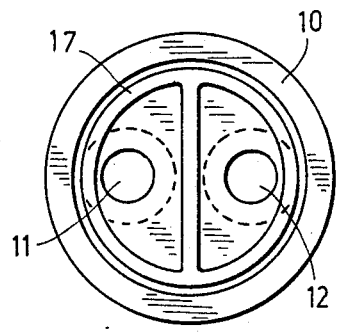
FIG. 2 is an axial view showing the interior of the envelope of the cartridge of the valve according to FIG. 1, containing only the sealing gasket for the fixed plaque.

Referring firstly to FIGS. 1 and 2, a valve according to the invention comprises a body 1 whose bottom is reached by two pipes 7 and 8 for the inlet of hot and cold water, respectively, which open in register with seatings 3 and 4 provided on the bottom of the valve body 1. Valve body 1 has an inner bore intended to receive a cartridge, and it forms an annular chamber 2 wherein the mixed water is collected. At the end opposite the inlet pipes 7 and 8, the body 1 is closed by a cover 5 provided with a sealing gasket 6. In this embodiment, the cover is screwed in the usual manner, but it has a peripheral knurl 5A by means of which the cover 5 can be manually applied or removed.

The changeable cartridge, introduced in an axially movable manner into the valve body 1, comprises an envelope 10, preferably made of plastics, provided with a peripheral sealing gasket 15 adapted to exert a radial sealing action within the bore of the body 1. In the embodiment now described, the peripheral sealing gasket 16 corresponds to the maximum diameter of the envelope 10. In this embodiment, the envelope 10 projects in a union 11 provided with a sealing gasket 16 and adapted to penetrate and to radially seal into the valve body seating 3 which communicates with the hot water inlet pipe 7. The communication with the cold water inlet pipe 8 takes place through a union 12 formed by a simple opening. The unions 11 and 12 are surrounded, within the envelope 10, by a sealing gasket 17 in the form of a ring with a diametral bridge, which gasket is seated in a corresponding seating formed in the bottom of the envelope 10. This gasket provides the seal relative to a fixed plaque 18 mounted on the gasket 17 within the envelope 10. The fixed plaque 18 has two openings, registering with the unions 11 and 12, for the passage of the hot and cold water, respectively.

Mounted in contact on the fixed plaque 18 there is a movable plaque 19 rigidly connected to a control slide 20 guided for diametrical movement in a ring 21 rotatable in the envelope 10, and which, at the side opposite the plaque 19, rests against a half bearing 22 fixed within the mouth portion of the envelope 10; the half bearing 22, on its turn, rests against the cover 5 which closes the valve body 1. Another half bearing 23 is housed within the cover 5, and between the half bearings 22 and 23 there is inserted an articulation ball 25, which seals thanks to a gasket 24. Rigidly connected to the ball 25 is an arm 26, directed towards the outside, to which a cap 28 with an operation lever 29 is connected. Towards the inside, to the ball 25 there is connected a second arm 27 which engages a corresponding seating of the control slide 20. This known arrangement allows, by rotating and variously tilting the lever 29, to displace the control slide 20 and, consequently, the movable plaque 19 relative to the fixed plaque 18, in order to regulate at will the flow which, arriving from the pipes 7 and 8, is mixed in the annular chamber 2 and then delivered through a delivery union, not shown.

Disposed within the seating 4 of the valve body 1, which communicates with the cold water inlet pipe 8, there is a spring 30 compressed between the bottom of the body 1 and the bottom of the cartridge envelope 10. This spring is designed in such a manner as to provide a resilient force corresponding to the force of adhesion between the plaques 18 and 19 of the valve, which is required for a regular operation at the minimum foreseenable feeding pressures.

The operation of the device is as follows. Independently from the hot and cold water feeding pressures, the spring 30 exerts onto the bottom of the cartridge evelope 10 a force directed towards the cover 5. This force is transmitted from the bottom of the envelope 10 to the fixed plaque 18 and from this latter to the movable plaque 19, to the slide 20, to the half bearing 22 and to the cover 5. Thus, this force acts entirely as a force of adhesion between the plaques 18 and 19, and ensures a regular operation of the valve at the low pressures. Furthermore, the pressure of the cold water supplied by the pipe 8 is present within the chamber delimited by the bottom of the body 1 and the bottom of the envelope 10, and within the openings of the fixed plaque 18, and it acts onto all the surfaces exposed to this pressure. It is to be noted, with reference to FIGS. 1 and 2, that this water pressure partly discharges directly onto the movable plaque 19, and by acting within the bottom of the envelope 10 it tends to move the same away from the plaques contained therein. Usually, this negative action (which is the only action which takes place in the known cartridges) is not sufficiently compensated by the action of the water pressure outside the bottom of the cartridge envelope 10; in fact, it should be taken into consideration that, should the union 12 be inserted into the seating 4 in a sealing manner, in the same manner in which the union 11 is inserted into the seating 3, the useful surface for the action of the water pressure from outside the bottom of the envelope 10 would be only the very reduced surface of the annular spaces indicated in FIG. 2 around the unions 11 and 12. On the contrary, with the arrangements according to the invention, the water pressure acts onto the entire considerable cross-section of the envelope of the cartridge, and thus the useful force directed towards the cover 5 largely prevails over the force which tends to separate the bottom of the envelope 10 from the plaques. Accordingly, anyhow the feeding pressure may increase, there will by always ensured an adequate adhesion between the plaques and between these latter and the bottom of the cartridge envelope. Since no appreciable force of inertia is involved in this operation of the device, this behaviour is obtained not only under static conditions, but in the presence of pressure shocks too.

Preferably, as already pointed out, the inlet union which communicates with the chamber delimited by the bottom of the valve body and the bottom of the cartridge is the union of the cold water, whose pressure is usually higher than that of the hot water. The union 11 with the gasket 16, inserted into the seating 3, ensures the separation between the two water feeding circuits, without interfering with the behaviour described hereinabove.

A suitable design of the components allows, in most part of the cases, to proportionate the force exerted by the water pressure in such a manner as to avoid that the operation of the valve becomes excessively hard to be accomplished even in the presence of high feeding pressures. To this end, or for other constructive reasons, the gasket 15 could be disposed on a portion of the envelope 10 having a diameter smaller than the maximum diameter of said envelope. However, if necessary, it is also possible to limit the action of the pressure. For example, one can give to free space 0, existing between the envelope 10 of the cartridge and cover 5, a thickness such that, after a pre-established compression of the inner parts of the cartridge, the envelope 10 will go to rest against the cover, thus discharging directly any force exceeding a predetermined limit.

Figure 3:
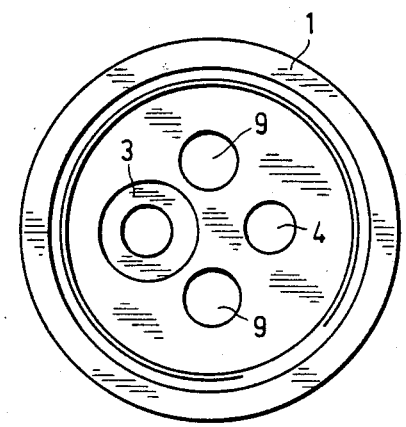
FIG. 3 is an axial view showing the interior of the valve body, singularly shown, according to a modification of the arrangement shown in FIG. 1.

With the arrangement shown in FIG. 1, the action of the spring 30 is eccentric. Generally, this does not give rise to any disadvantage but, if it is desired to obtain a balanced action, it is sufficient to install two springs, for example one in each seating 3, 4, or in other positions. For example, according to FIG. 3, two seatings 9 for springs may be provided in the bottom of the body 1, in quadrature with the seatings 3 and 4 into which the pipes 7 and 8 open.

Figure 4:
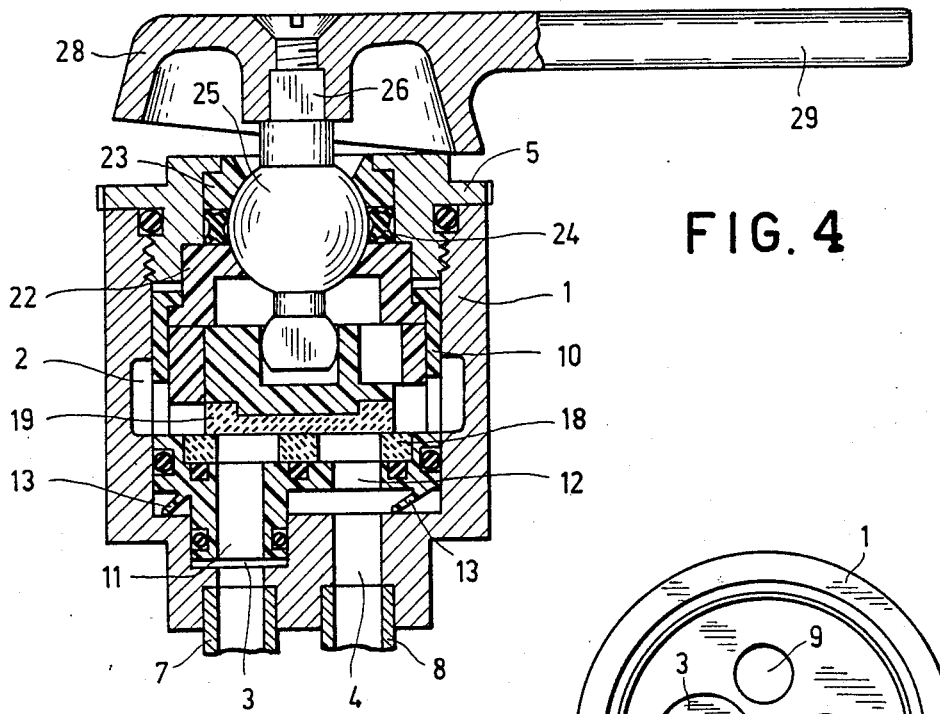

The resilient member acting between the valve body and the cartridge may also be realized in a form different from that of one or more springs. For example, according to FIG. 4, some resilient tabs 13 are integrally formed during the forming of the envelope 10 of the cartridge and are resiliently deformed by resting against the bottom of the valve body during the insertion of the cartridge; the tabs 13 provide then the desired preloading force. This embodiment of the invention, simple and economical, may be adopted whenever the envelope 10 of the cartridge is made of a plastic material, as for example the Hostaform, which has appropriate resiliency characteristics.

Figure 5:
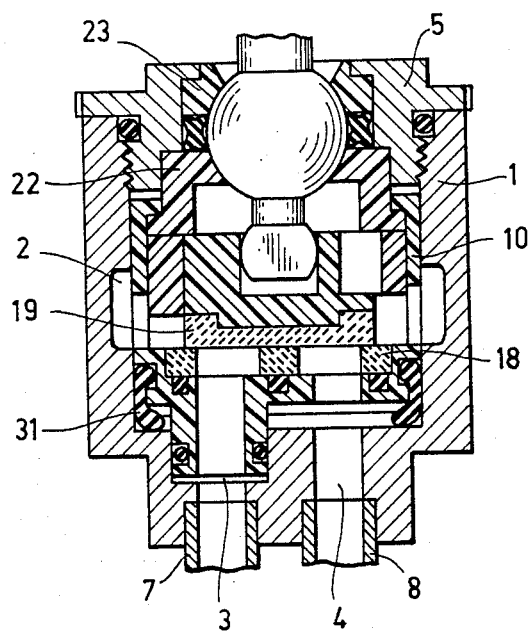

Another way for providing the resilient member acting between the valve body and the cartridge is shown in FIG. 5. In this case, the perimetral gasket of the envelope 10 of the cartridge is not a simple ring 15, but it is formed by a body 31 axially extending and protruding beyond the bottom of the envelope 10, so as to rest against the bottom of the body 1 and thus exert a resilient thrust onto the cartridge. In this way, the same member is utilized for providing the seal of the cartridge with respect to the valve body and as a resilient member for generating the preload of the plaques.

Figure 6:
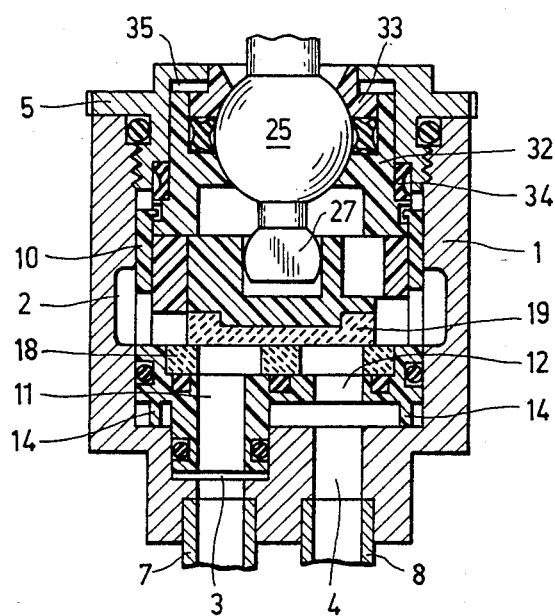
FIGS. 4, 5 and 6 are cross-sectional views similar to that of FIG. 1, showing three other embodiments of the invention.

In the embodiments described so far, it was supposed that the resilient member acting between the valve body and the cartridge should apply onto the cartridge a force in the direction towards the cover 5. It should however be understood that the direction of this force could be reversed. An example is shown in FIG. 6. In this embodiment, the mechanism of the valve is somewhat modified, inasmuch as the half bearing 23 inserted into the cover according to FIG. 1 is replaced by a half bearing 33 fixed (in a stationary or removable manner) into a tubular extension of the other half bearing 32. With this construction, the articulation ball 25 results in being positively connected to the cartridge during the withdrawal of this latter, which withdrawal is thus facilitated. In this case, the sealing gasket 24 does not cooperate with the cover 5, and another sealing gasket 34 disposed between the half bearing 32 and the cover 5 is required. This latter gasket may be entrusted also with the task of acting as a resilient member, by pushing towards the bottom of the body the cartridge, whose envelope 10 is provided in this case with projections 14 intended to rest against the bottom of the body 1 in order to separate the cartridge therefrom and to ensure the formation of a pressure chamber communicating with the seating 4, as is necessary for obtaining the desired operation. In this case, when the feeding pressure increases, the cartridge is displaced within the body 1, thus compressing the gasket 34, until it takes up the clearance 35 between the half bearing 32 and the cover 5, and therafter the cartridge finds a positive rest against the cover. As long as the displacement of the cartridge is absorbed by the compression of the sealing gasket 34, as well as when a positive rest against the cover 5 is obtained, the transmission of the pressure takes place through the contact between the plaques 18 and 19, as in the embodiment shown in FIG. 1.

In the embodiments described hereinabove, the envelope 10 of the cartridge projects by a portion thereof to form the sealing union between the cartridge and a seating of the valve body. These embodiments have among others the advantage that the union 11, provided in this way, also serves to prevent the cartridge from rotating within the cavity of the body 1. However this union may also be provided in different manners; for example, the union may be formed by a tubular body made of a yielding material of the type of the rubber, sealingly and slidably inserted into a seating of the body and pushed against the cartridge by a spring housed within the union itself. Of course, in an embodiment of this type there must be provided separate means for preventing the cartridge from rotating within the cavity of the body.

The embodiments shown in FIGS. 7 to 12 refer to those types of valves wherein the delivery union opens into the bottom of the valve body. In the cross-sectional views of FIGS. 8, 9, 11 and 12, the valve portion lying under the contact plane between the fixed and movable plaque is shown in a cross-section taken along the already stated line, whilst the portion lying above said plane, for the sake of a better understanding of the representation, is shown in a cross-section taken along line VII—VII of FIG. 7 or, respectively along line X—X of FIG. 10.

Figure 8:
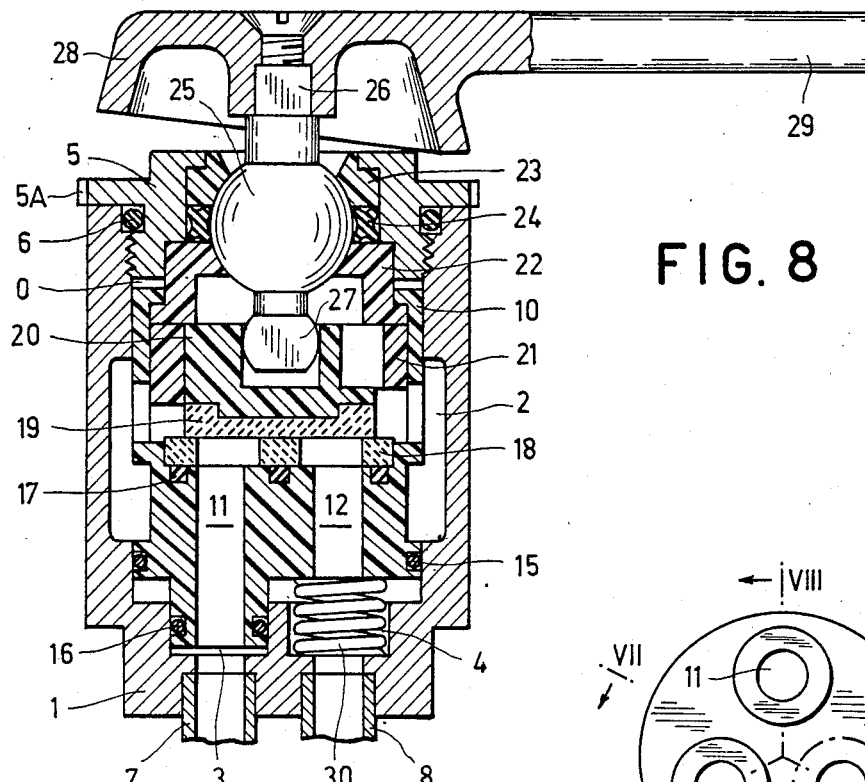
FIG. 8 is a cross-sectional view, taken along line VIII—VIII of FIG. 7, of a mixer valve using the cartridge according to FIG. 7.
Figure 7:
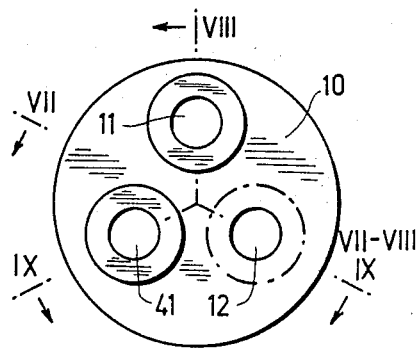
FIG. 7 is an axial view of the cartridge bottom of another embodiment of a mixer valve according to the invention.
Figure 9:
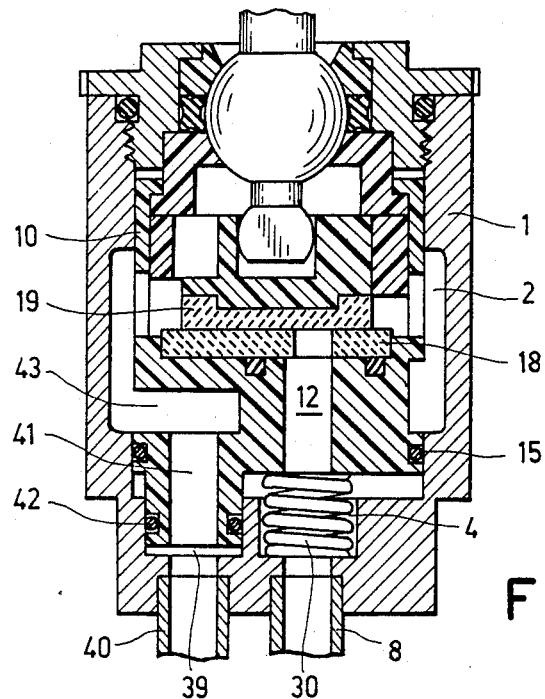
FIG. 9 is a cross-sectional view thereof, taken along line IX—IX of FIG. 7.

The valve according to FIGS. 7 to 9 corresponds to that according to FIGS. 1 and 2, except in that the cartridge envelope also projects to form a union 41, provided with a gasket 42, which through a recess 43 communicates with the annular chamber 2, and which is suitable for being inserted and radially seal into a seating 39 of valve body 1, which seating communicates with a delivery union 40. Therefore, in this embodiment, the mixed water collected within the annular chamber 2 is directed, through the recess 43 and the union 41, towards the delivery union 40, by remaining separate from the cold water inlet 8 due to the gasket 42.

Figure 11:
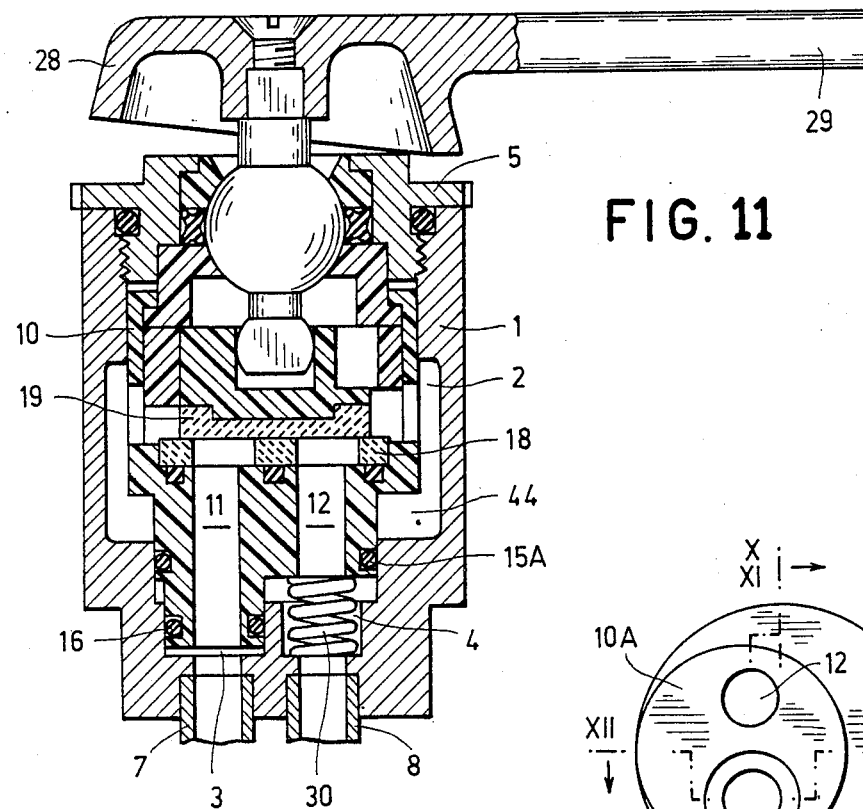
FIG. 11 is a cross-sectional view, taken along line XI—XI of FIG. 10, of a mixer valve using the cartridge according to FIG. 4.
Figure 10:
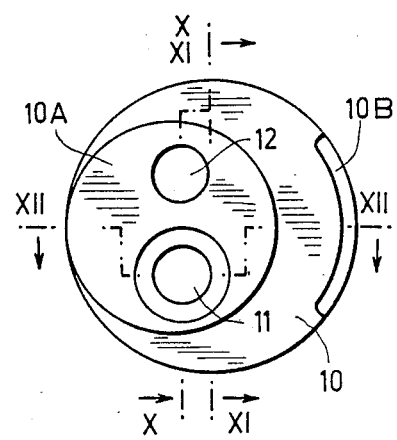
FIG. 10 is an axial view of the cartridge bottom of a further embodiment.
Figure 12:
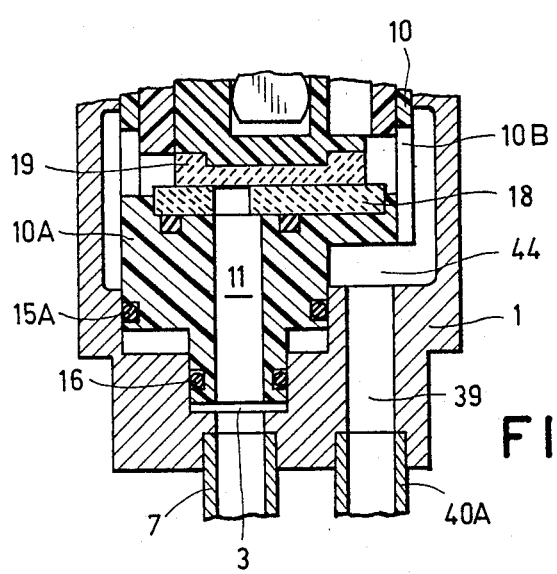
FIG. 12 is a cross-sectional view thereof, taken along line XII—XIII of FIG. 10.

In the embodiment according to FIGS. 10 to 12, the cartridge envelope 10 extends towards the bottom by forming an eccentric projection 10A which penetrates in a correspondingly eccentric portion of the bore of valve body 1 and is slidable therein with seal due to the gasket 15A. The unions 11 and 12 for hot and cold water are arranged in said eccentric projection 10A and they register with the water inlet pipes 7 and 8, which correspondingly open in the eccentric portion of the bore of body 1. On the contrary, the delivery union 40A passes sideways the eccentric bore and opens into a space 44 which directly communicates with the annular chamber 2, whereby the mixed water contained in chamber 2 directly flows towards the delivery union 40A without re-entering the cartridge, and a sealing gasket such as 42 is no more needed.

The cartridge envelope 10 may advantageously have, as an outlet for mixed water, some openings 10B which open towards the bottom of valve body 1, and this allows to reduce the size of the annular chamber 2 or even to completely omit this chamber.

Of course, in the just described embodiment the cross-section of the cartridge onto which the pressure of incoming cold water acts is less than it was in the first embodiment, and therefore this embodiment is particularly suitable for operating under high feed pressures, which could give rise to an exceeding push when acting onto the whole cross-section of the cartridge.

In particular embodiments, the envelope of the cartridge could be reduced to the shape of a disc or the like, against which the fixed plaque rests and which may be axially displaced in a sealing manner, thus performing, also in this case, the operation of transmitting to the plaques the forces exerted by the resilient member and the pressure of the water.

Of course, also other modifications may be made to what has been described and shown. For example, the cover 5 may be applied to the body 1 by means of a bayonet joint or by means of an elastic fastener or in another way adapted to be carried out manually, thanks to the reduced value of the preloading force which has to be generated through the application of the cover. The particular configuration of the inner mechanisms of the cartridge is not important for the application of the invention, and therefore it way be varied with respect to what has been shown by way of example.

It is understood that subjects of the invention are both the described cartridge valves, as a whole, and the cartridges for said valves.

I claim:

1. A mixer valve comprising a valve body having at least one bore and a bottom, a cover closing said valve body opposite said bottom, seatings provided in said bottom of the valve body, two water inlet pipes connected to said seatings, a delivery union connected to said valve body, control means applied to said valve body, a changeable cartridge having an envelope inserted into said valve body with an axial clearance, a hard material fixed plaque mounted in said cartridge, at least one movable plaque housed in said cartridge, connected to the control means and intended to cooperate with said fixed plaque for carrying out the regulation of the flow rate and the mixing ratio, said cartridge having near its bottom end a peripheral sealing gasket intended to radially seal into a corresponding bore of the valve body, a sealing union inserted between said cartridge and one of said seatings of the valve body communicating with one of said water inlet pipes, the other water inlet pipe directly communicating with the bottom portion of said bore of the valve body, and the remaining portion of said bore of the valve body communicating with said delivery union; whereby the pressure of said other water inlet pipe, present within the bottom portion of the valve body, acts onto the cartridge as onto a piston, thus applying to the plaques a force which increases with increasing feeding pressure.

2. A mixer valve as set forth in claim 1, further comprising a resilient member inserted between said valve body and said cartridge, whereby said resilient member permanently applies a preloading force onto said plaques.

3. A mixer valve as set forth in claim 2, wherein said resilient member is formed by at least one spring arranged in at least one of said seatings of the bottom of the valve body.

4. A mixer valve as set forth in claim 2, wherein said resilient member is formed by one or more resilient tabs provided on the cartridge envelope and resting against the bottom of the valve body.

5. A mixer valve as set forth in claim 2, wherein said resilient member is formed by said peripheral gasket of the cartridge envelope, which extends longitudinally up to resilient rest against the bottom of the valve body.

6. A mixer valve as set forth in claim 2, wherein said resilient member is a sealing gasket disposed between a portion of the cartridge, on which said plaques indirectly rest, and said cover of the valve body, and the envelope of the cartridge is provided with spacing projections directed towards the bottom of the valve body.

7. A mixer valve as set forth in claim 1, further comprising means intended to limit the maximum value of the force applied onto said plaques by the water pressure.

8. A mixer valve as set forth in claim 7, wherein said limiting means comprise a pre-established clearance between the envelope of said cartridge and said valve cover, whereby after the taking up of said clearance a direct rest of the cartridge envelope against the cover takes place.

9. A mixer valve as set forth in claim 1, wherein said cartridge envelope has a projecting union having a radial sealing gasket, intended to be inserted in one of said seatings of the valve body which communicates with one of the water inlet pipes.

10. A mixer valve as set forth in claim 1, wherein said delivery union, communicating with said remaining portion of the bore of the valve body, opens in the bottom of the valve body.

11. A mixer valve as set forth in claim 10, wherein said bottom of the valve body has a seating communicating with said delivery union, and said cartridge envelope has a first projecting union, having a gasket for radial sealing and intended to be inserted into a corresponding seating of the valve body which communicates with one of the water inlets, as well as a second projection union, having a gasket for radial sealing and intended to be inserted into said seating of the valve body which communicates with the delivery union.

12. A mixer valve as set forth in claim 1, wherein said valve body has a main bore and an eccentric bore extending said main bore towards the bottom, said cartridge envelope has an eccentric projection carrying said peripheral gasket and intended to be inserted into said eccentric bore of the valve body, and the water inlet pipes open into said eccentric bore, whereas said delivery union passes sideways said eccentric bore and opens into the valve body beyond said peripheral sealing gasket.

13. A mixer valve as set forth in claim 12, wherein said cartridge envelope has, as an outlet for mixed water, some openings which open at least partially towards the bottom of the valve body.

14. A mixer valve as set forth in claim 1, wherein said cartridge envelope is a simple bottom, sealingly slidable within the valve body.

15. A mixer valve as set forth in claim 1, wherein said cartridge has a bottom which is sealingly slidable within the remaining portion of the cartridge envelope.

* * * * *